United States Patent
Porte et al.

(10) Patent No.: US 8,250,852 B2
(45) Date of Patent: Aug. 28, 2012

(54) DUAL FLOW TURBINE ENGINE EQUIPPED WITH A PRECOOLER

(75) Inventors: Alain Porte, Colomiers (FR); Damien Prat, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 1086 days.

(21) Appl. No.: 12/160,190

(22) PCT Filed: Jan. 18, 2007

(86) PCT No.: PCT/FR2007/000091
§ 371 (c)(1),
(2), (4) Date: Jul. 7, 2008

(87) PCT Pub. No.: WO2007/083027
PCT Pub. Date: Jul. 26, 2007

(65) Prior Publication Data
US 2009/0007567 A1   Jan. 8, 2009

(30) Foreign Application Priority Data
Jan. 19, 2006 (FR) ..................... 06 00473

(51) Int. Cl.
*F02K 3/02* (2006.01)
(52) U.S. Cl. ............... 60/226.1; 60/266; 60/785
(58) Field of Classification Search .......... 60/39.83, 60/226.1, 266, 785
See application file for complete search history.

(56) References Cited

U.S. PATENT DOCUMENTS

| | | | |
|---|---|---|---|
| 4,254,618 A | 3/1981 | Elovic | |
| 4,493,184 A | 1/1985 | Nikkanen | |
| 5,127,222 A | 7/1992 | Ream | |
| 5,269,135 A * | 12/1993 | Vermejan et al. | 60/226.1 |
| 5,729,969 A * | 3/1998 | Porte | 60/226.1 |
| 5,782,077 A | 7/1998 | Porte | |

FOREIGN PATENT DOCUMENTS

| | | |
|---|---|---|
| EP | 0 743 435 | 11/1996 |
| FR | 2 400 618 | 3/1979 |
| GB | 2 272 025 | 5/1994 |
| GB | 2 277 781 | 11/1994 |

OTHER PUBLICATIONS

International Search Report dated May 29, 2007 w/ English translation.
Written Opinion of the International Searching Authority with English translation.

* cited by examiner

*Primary Examiner* — Ehud Gartenberg
*Assistant Examiner* — Lorne Meade
(74) *Attorney, Agent, or Firm* — Dickinson Wright PLLC

(57) ABSTRACT

A pre-cooler having an annular cross-sectional shape about the axis of a pod and arranged inside the rear part of an inner shroud in external contact with a cold flow exiting a fan duct channel and in close contact with a cooling air stream drawn from the cold flow.

10 Claims, 7 Drawing Sheets

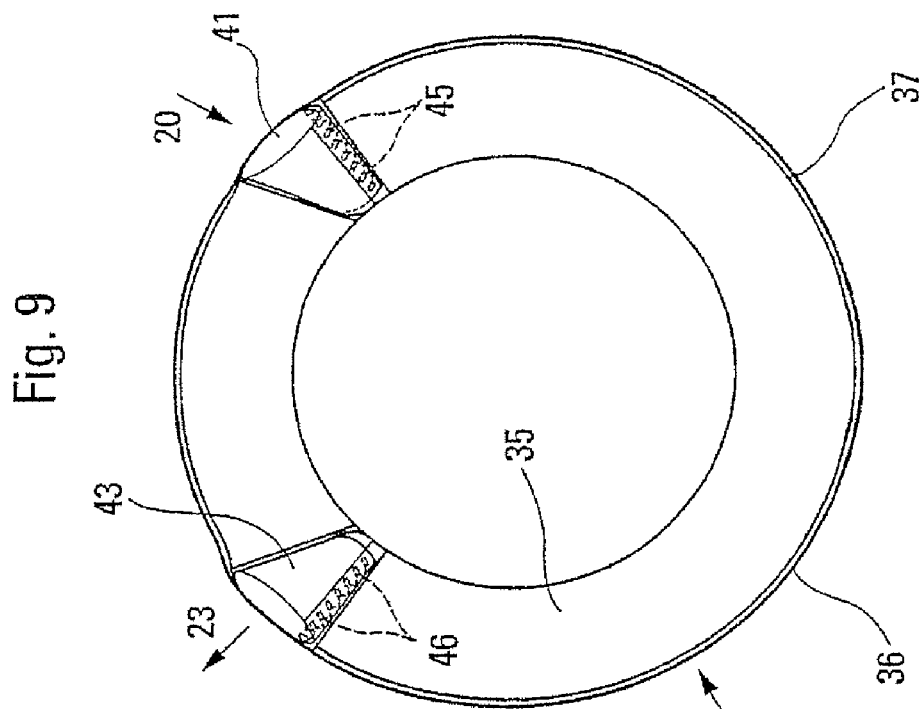
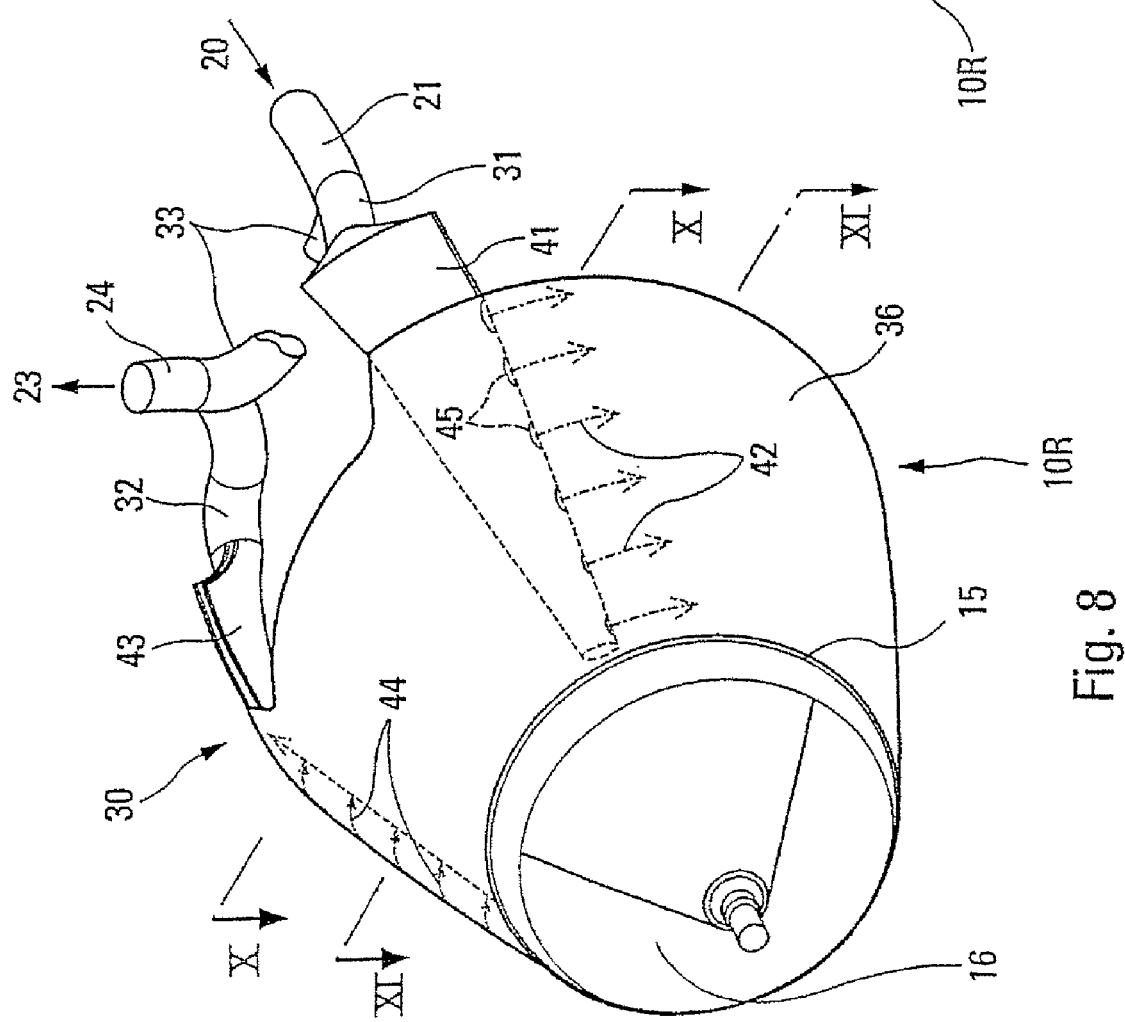

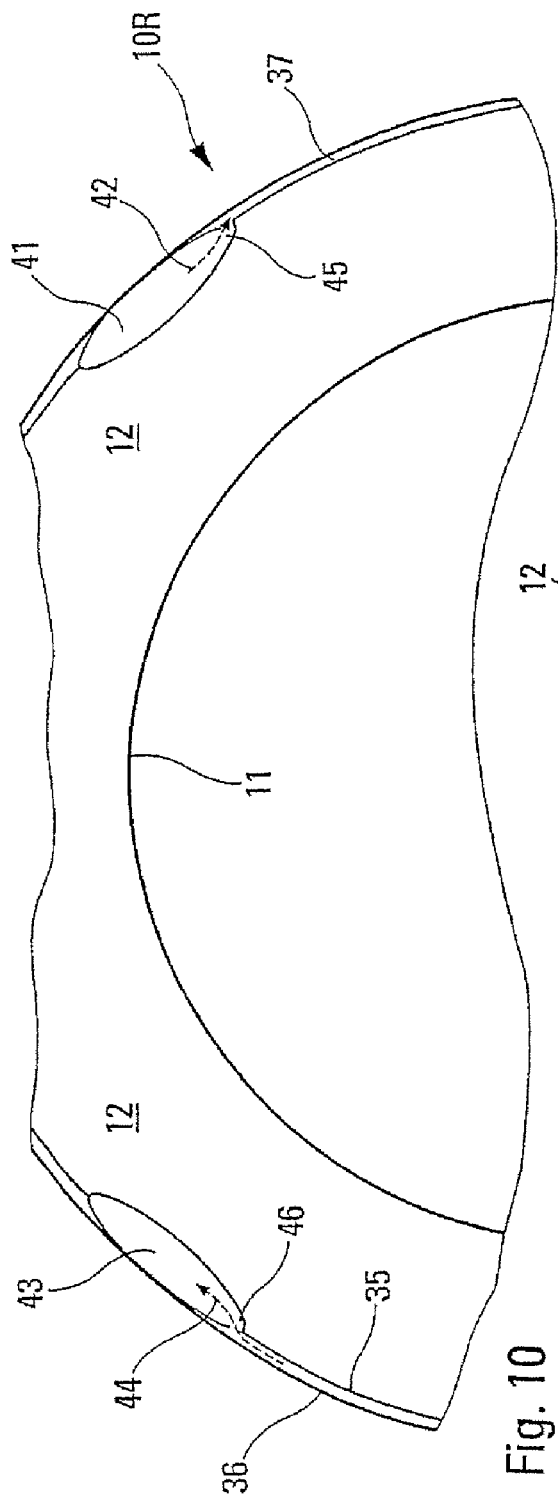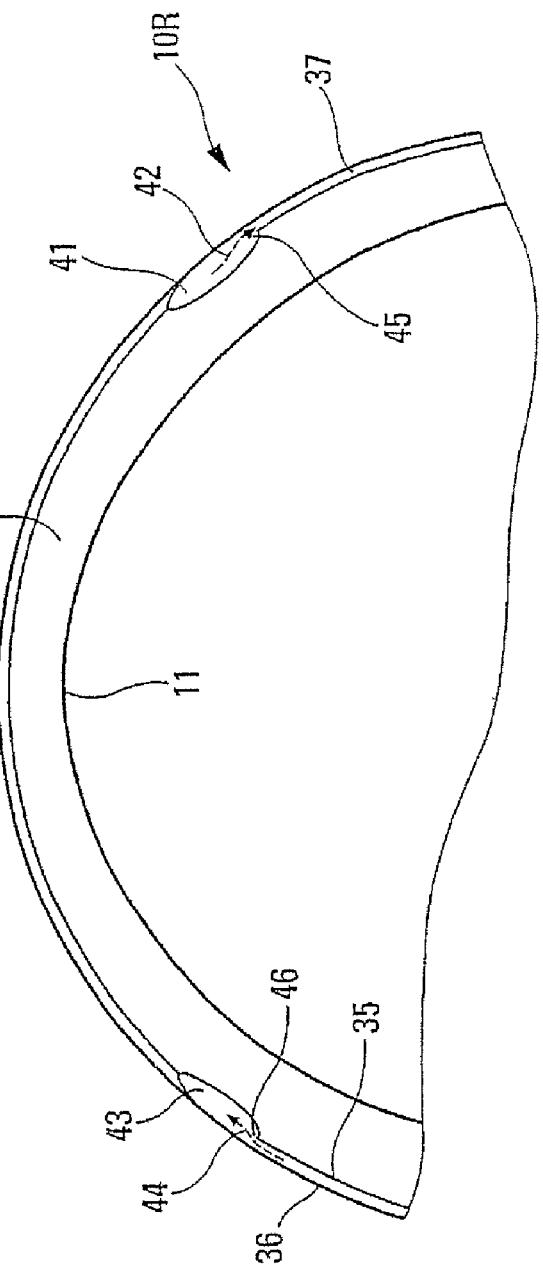

DUAL FLOW TURBINE ENGINE EQUIPPED WITH A PRECOOLER

FIELD OF THE INVENTION

The present invention relates to a bypass turbine engine provided with a precooler.

BACKGROUND OF THE RELATED ART

It is known that, on board an aircraft, it is necessary to have hot air available to perform certain functions, such as air conditioning in the cockpit and the passenger cabin or for deicing certain parts of the aircraft.

It is also known that this hot air is taken from the turbine engines of the aircraft and has to be cooled significantly before it can be used. To do this, a heat exchanger is provided, this generally being known as a precooler, in which the hot air bled from the central generator of the turbojet engine is cooled by cold air bled from the fan duct, that is to say from the cold stream of the turbine engine. Such a precooler is generally housed in said fan duct, and this generates aerodynamic disturbances in said cold stream of the turbine engine.

What is more, the cold air bled from the cold stream of the turbine engine and used to cool the hot stream bled from the central generator gives rise to a current of heated cold air, which has to be discharged to the outside of the turbine engine, thus increasing the drag of the aircraft.

SUMMARY OF THE INVENTION

It is an object of the present invention to remedy the disadvantages of the prior art.

To these ends, according to the invention, the bypass turbine engine for an aircraft comprising:
- a hollow nacelle of longitudinal axis provided, at the front, with an air inlet and, at the rear, with an air outlet;
- a central hot-stream generator, positioned axially in said nacelle;
- a fan positioned axially in said nacelle forward of said central generator and able to generate the cold stream for said turbine engine;
- an outer fairing borne internally by said nacelle and an inner fairing surrounding said central generator, said outer and inner fairings between them delimiting a fan duct of annular cross section for said cold stream and said inner fairing delimiting with said central generator an intermediate chamber of annular cross section surrounding said central generator and provided with at least one rear orifice at the periphery of said hot stream; and
- a precooler comprising an inlet for a current of hot air bled from said central generator and an outlet for a current of cooled hot air generated using said cold stream, is notable:
- in that said precooler is positioned inside said intermediate chamber in thermal contact with the rear part of the inner fairing, forming an intermediate passage between said precooler and said central generator; and
- in that, forward of said precooler, there is at least one air intake passing through said inner fairing and bleeding from said cold stream, a current of cooling air able at least partially to cool said current of hot air entering said precooler.

Thus, by virtue of the present invention it is possible to avoid aerodynamic disturbances in the fan duct attributable to the precooler because the precooler is now housed in the rear part of said inner fairing. In addition, the disadvantages attributable to discharging the heated cold air are avoided because said precooler uses, on the outside, the cold stream leaving the fan duct and which blows said rear part of the inner fairing and, on the inside, said current of cooling air bled from said cold stream by said air intake, passing through said intermediate passage from said air intake as far as said rear orifice and discharged through said rear orifice from the intermediate chamber.

As a preference, said air intake is equipped with a controllable shut-off device. Thus, when the flight conditions are such that the desired temperature of said current of cooled hot air can be obtained using just the cold stream acting on the outside of the precooler, said air intake is closed so that no current of cooling air is bled from said cold stream.

It would be possible to provide a plurality of air intakes distributed at the periphery of the inner fairing. However, as a preference, just one single air intake is used, this being associated with means for setting said current of cooling air in rotation inside said intermediate chamber about said longitudinal axis.

As a preference, in order to obtain satisfactory areas for heat exchange between the hot air flowing through said precooler, the cold flow blowing onto the latter externally and the current of cooling air passing through the intermediate passage, provision is made for said precooler and said intermediate passage to have a shape of annular cross section extending over the entire internal periphery of said rear part of the inner fairing, about said longitudinal axis.

In a preferred embodiment of the present invention, said inner fairing is, at least in its rear part, double walled, that is to say comprises an inner wall and an outer wall which are separated from one another by a space in the form of an annular gap, and said precooler is positioned in said space.

To these ends, said precooler may comprise:
- a distribution pipe, connected to said inlet for the current of hot air and able to distribute said hot air to at least approximately the entire length (parallel to the longitudinal axis of the nacelle) of said annular space; and
- a collection pipe connected to said outlet for the current of cooled hot air and able to collect said cooled hot air over at least approximately the entire length of said annular space.

As a preference, between said distribution pipe and said collection pipe (which pipes are positioned at the internal periphery of the rear part of the inner fairing in a way that is optimized for the cooling of the hot air), said precooler comprises a plurality of curved ducts for guiding the hot air, said ducts being transverse to the longitudinal axis of the nacelle and distributed over the length of said annular space.

Such ducts may advantageously be formed by a framework that reinforces the inner fairing, secured to said inner and outer walls thereof.

Advantageously, in order to provide even finer and easier regulation of the temperature of the cooled hot air, a duct is provided, preferably equipped with a controllable valve, mounted in parallel with said precooler and connecting its hot air inlet to its cooled hot air outlet.

BRIEF DESCRIPTION OF THE DRAWINGS

The figures of the attached drawing will make it easy to understand how the invention may be embodied. In these figures identical references denote elements that are similar.

FIG. 8 is an external view in perspective from the rear depicting said inner fairing.

FIG. 9 is an external view from the front of said inner fairing.

FIGS. 10 and 11 are partial cross sections on X-X and XI-XI of FIG. 8, respectively.

DETAILED DESCRIPTION OF THE INVENTION

Figure 1:
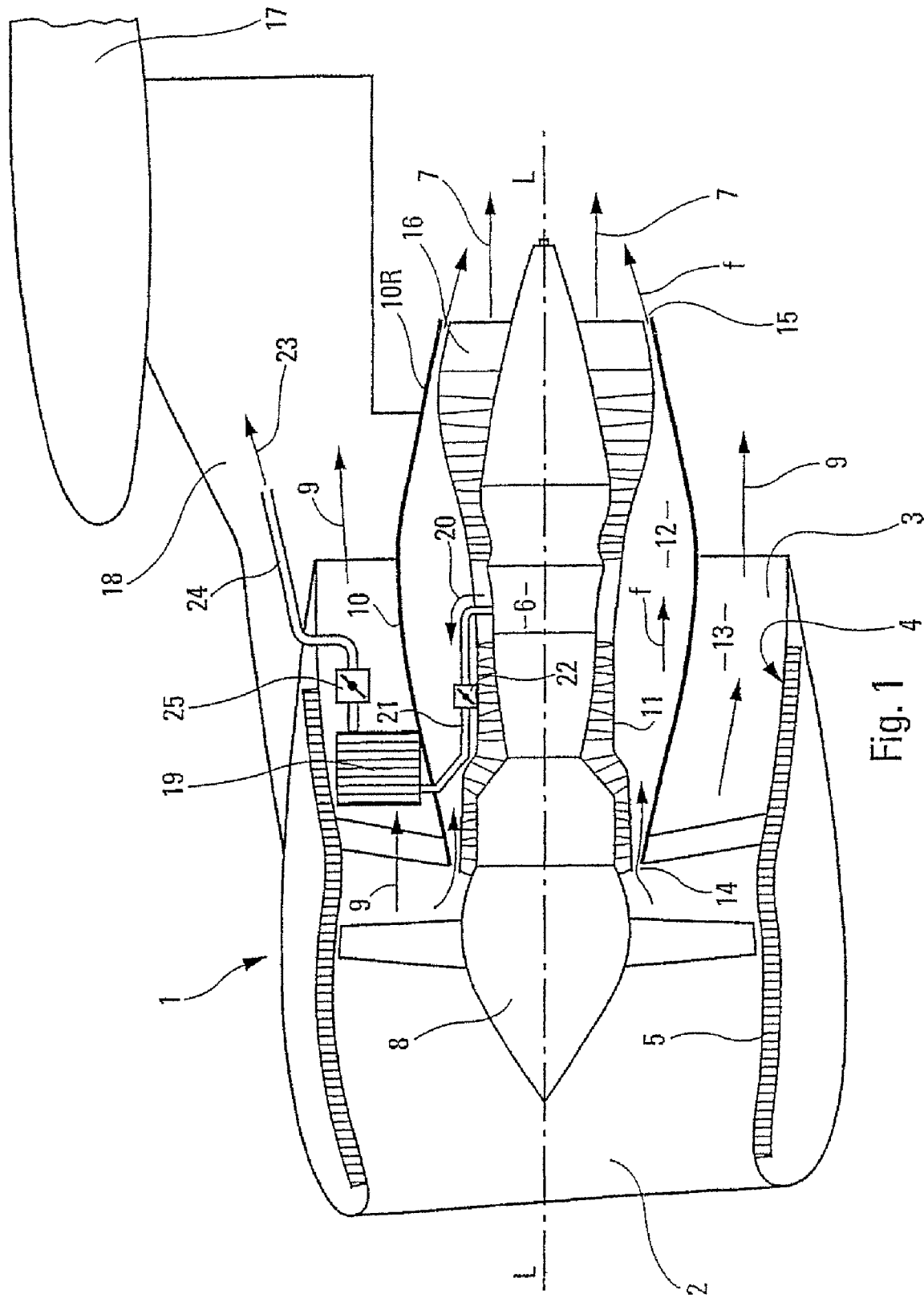
FIG. 1 illustrates, in schematic axial section, a known bypass turbine engine.
Figure 2:
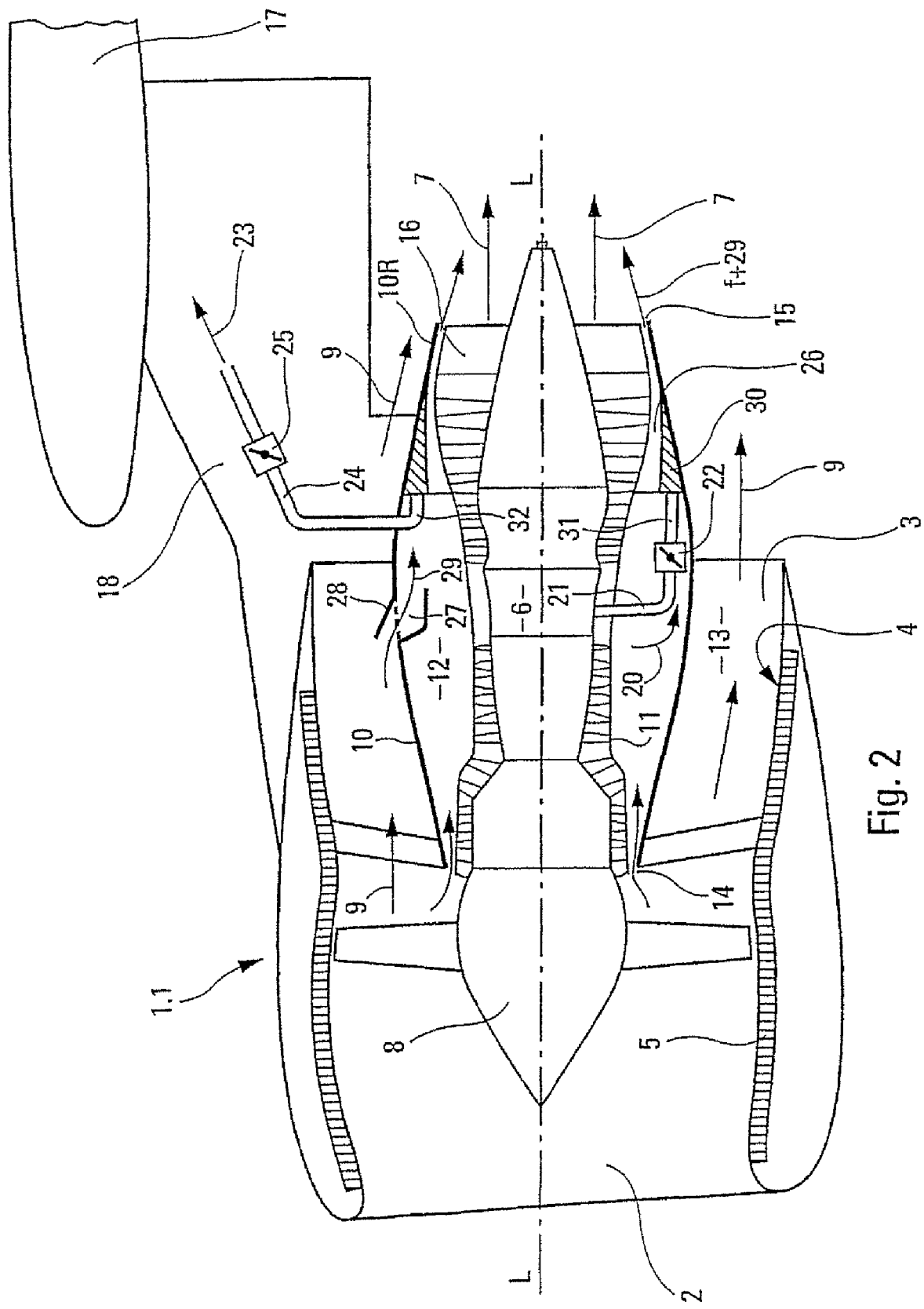
FIGS. 2 and 3 illustrate, in views similar to FIG. 1, two alternative forms of the turbine engine according to the present invention.
Figure 3:
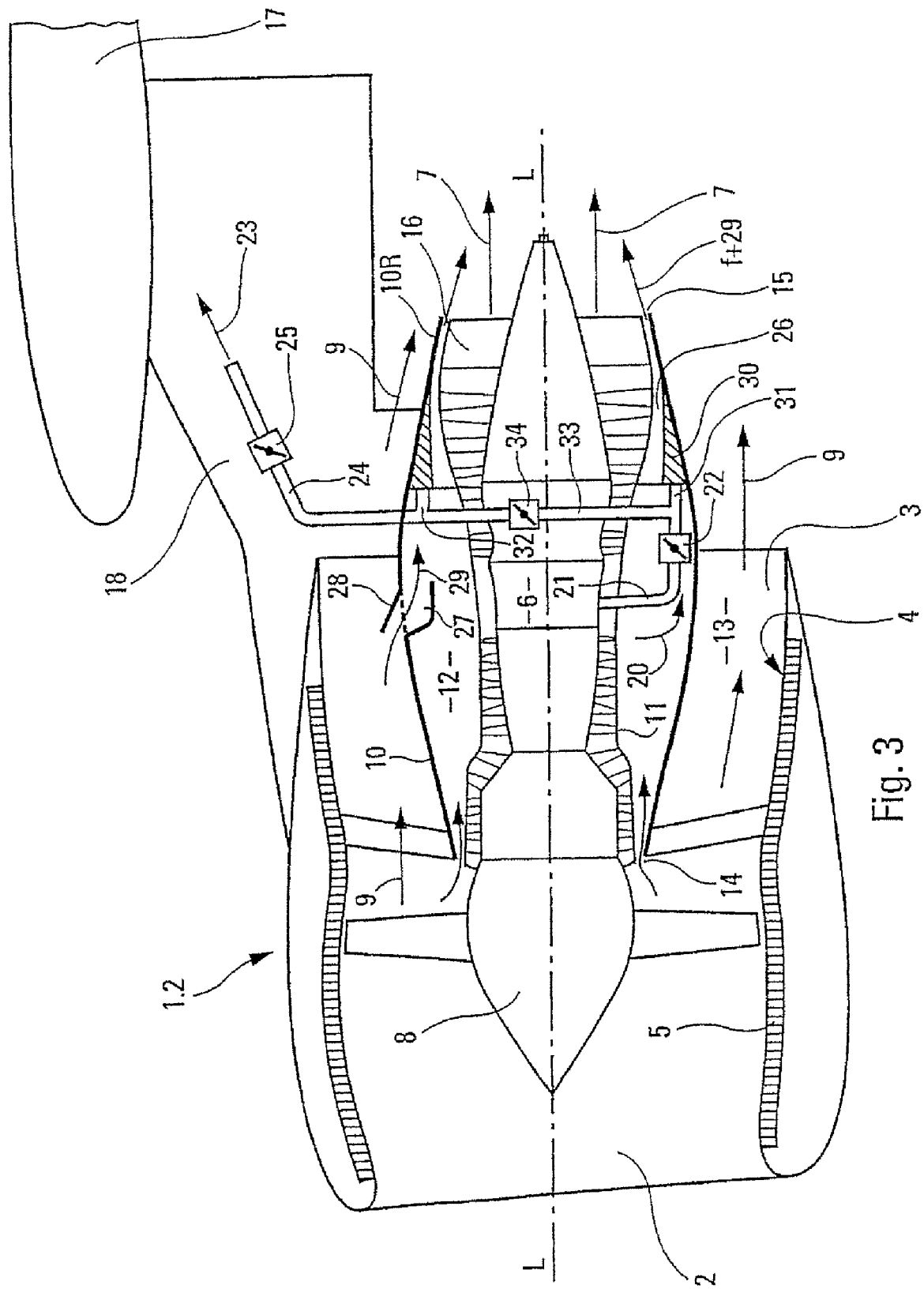

The bypass turbine engine shown by each of FIGS. 1, 2 and 3, comprises a hollow nacelle 1 of longitudinal axis L-L provided, at the front, with an air inlet 2, and, at the rear, with an air outlet 3. Said hollow nacelle 1 internally bears a fairing 4, preferably at least partially coated with acoustic attenuation coatings 5 intended to reduce the internal noise of said turbine engine.

Positioned inside the hollow nacelle 1 are:
a central hot stream generator 6 comprising, in the known way, low-pressure and high-pressure compressors, a combustion chamber and low-pressure and high-pressure turbines, and generating the axial hot stream 7 of said turbine engine;
a fan 8 positioned axially in front of said central generator 6 and generating the annular cold stream 9 of said turbine engine; and
an inner fairing 10 surrounding said central generator 6 and forming, between itself and the casing 11 of this generator, an intermediate chamber 12 of annular cross section surrounding said generator, the rear part 10R of said fairing forming the outer wall of the jet pipe 16 for said hot stream 7.

The inner fairing 10 and the fairing 4, external to it, between them form a fan duct 13 of annular cross section surrounding the central generator 6 and through which the cold stream 9 flows.

Formed between the inner fairing 10 and the central generator 6 are, at the front, an annular air intake slot 14, and, at the rear, an annular air discharge slot 15. Thus, the intermediate chamber 12 can be swept by a ventilation current f bled from the cold stream 9 at the front slot 14 and discharged at the boundary between said hot stream 7 and said cold stream 9 at the rear slot 15, this ventilation current f being used to regulate the temperature of the central generator 6.

Furthermore, in the usual way, the nacelle 1 is supported by a wing 17 of the aircraft (this wing is depicted in part) via a suspension pylon 18.

In the known turbine engine illustrated in FIG. 1, a precooler 19 is provided, this being positioned in the upper part of the fan duct 13 in the cold stream 9. This precooler 19 is fed with a current of hot air 20, from the central generator 6, via a duct 21 on which there is a hot air regulating valve 22. The cooled hot air 23 generated by the precooler 19 is dispatched to the user equipment (not depicted) via a duct 24 which passes through the suspension pylon 18 and which may be fitted with a regulating valve 25.

Thus, in this known layout, some of the cold stream is bled off by the precooler 19 to cool the current of hot air 20 and to generate the cooled hot air current 23 and this also results in said precooler forming a current of heated cold air (not depicted) corresponding to said bled-off portion of the cold stream. This current of heated cold air is discharged to the outside, in any known way not depicted in FIG. 1, and generally causes an increase in drag.

It will be readily understood therefore that the presence of the precooler 19 in the fan duct 13 and the discharging of the heated cold air are detrimental to the performance of the known engine illustrated in FIG. 1.

In the nacelle 1.1, according to the present invention and depicted in FIG. 2, we find all of the elements 2 to 18 and 20 to 25 described with reference to FIG. 1.

However, in this nacelle 1.1, the precooler 19 has been replaced by a precooler 30 positioned inside the intermediate chamber 12 in thermal contact with the rear part 10R of the fairing 10. The precooler 30 has a shape of annular cross section about the axis L-L and extends over the entire periphery of this rear part 10R. In addition, the precooler 30 forms an intermediate passage 26, of annular cross section, about the axis L-L between itself and the central generator 6, said intermediate passage 26 opening to the rear via said annular air discharge slot 15.

Further, in the nacelle 1.1 of FIG. 2 there is, forward of the precooler 30, an air intake 27 provided with shut-off means 28 and passing through said fairing 10. When open, the air intake 27 is able to bleed a current of cooling air 29 from said cold flow 9.

Thus, on the outside, the precooler 30 is cooled by the cold stream 9 leaving the fan duct 13 and sweeping over the rear part 10R of the inner fairing 10 whereas, on the inside, when the air intake 27 is open, it is additionally cooled by said current of cooling air 29 passing through the intermediate passage 26 and exiting via the slot 15.

The precooler 30 has an inlet 31 connected to the duct 21 supplying the hot air current 20 and an outlet 32 connected to the duct 24 carrying the cooled hot air 23.

FIG. 3, which shows all the elements of FIG. 2, additionally shows the existence, in the nacelle 1.2 according to the invention of a bypass duct 33 mounted in parallel with the precooler 30, connecting its inlet 31 and its outlet 32 and provided with a valve 34. Thus, if necessary, hot air can be routed directly from the inlet 31 to the outlet 32, thereby bypassing the precooler 30.

Figure 4:
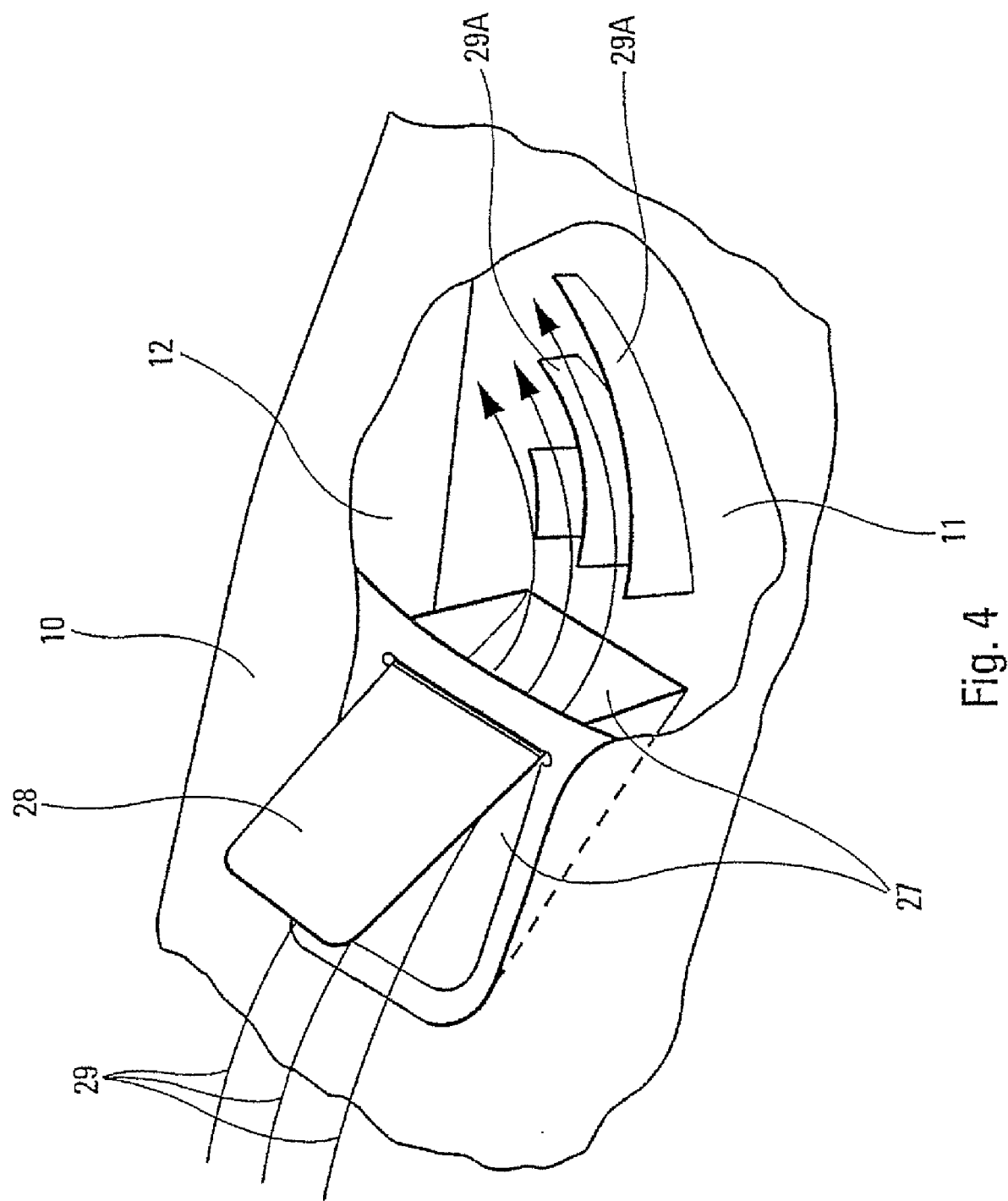
FIG. 4 illustrates a partial perspective view of the cold air intake in the fan duct.

FIG. 4 depicts an embodiment of the air intake 27 with its shutter 28 (but without the means of actuating the latter). Positioned in the chamber 12 on the casing 11 of the generator 6 are vanes 29A for setting the current of cooling air 29 in rotation about the axis L-L.

The exemplary embodiment of the precooler 30 which is illustrated by FIGS. 5 to 11 is structurally incorporated into said rear part 10R of the inner fairing 10.

Figure 5:
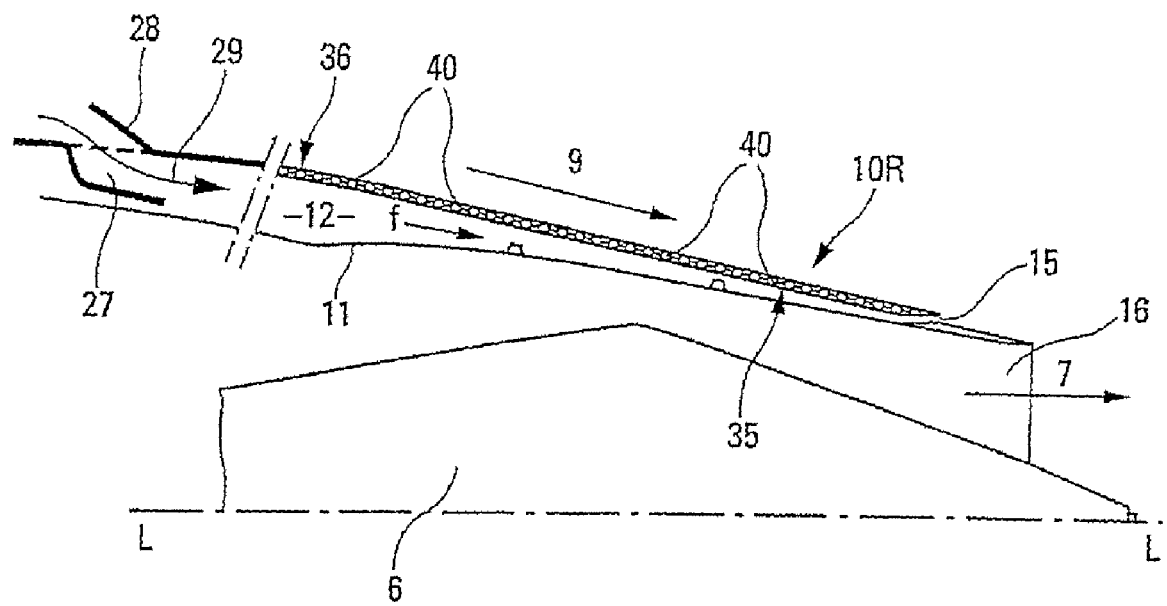
FIG. 5 illustrates, in schematic longitudinal half section, the inner fairing surrounding the hot stream of the engines of FIGS. 2 and 3.
Figures 6, 7:
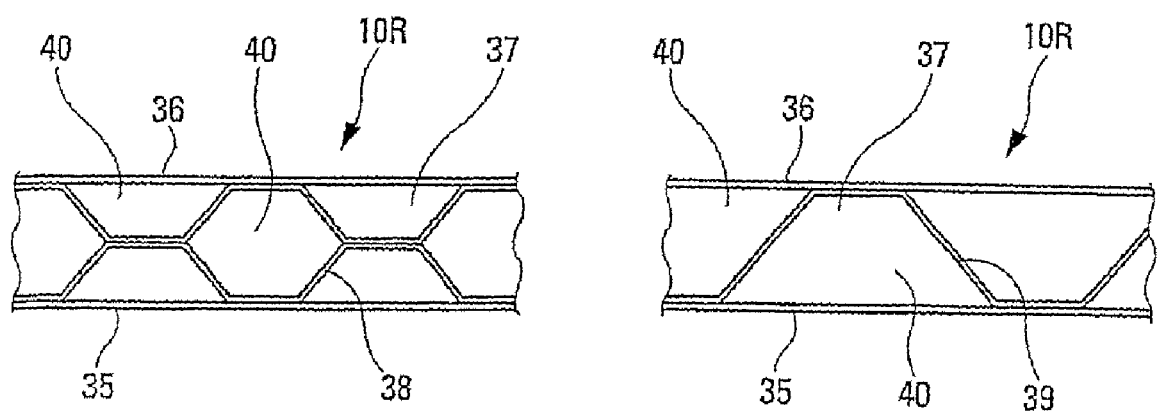
FIGS. 6 and 7 illustrate, on a larger scale, the structure of the fairing of FIG. 5.

As can be seen in FIGS. 5 to 7, said rear part 10R comprises an inner wall 35 and an outer wall 36 which are parallel and spaced apart from one another by a space 37 in the form of an annular gap. Positioned in this space is a framework 38 (FIG. 6) or 39 (FIG. 7) secured to said inner and outer walls 35 and 36 and delimiting curved ducts 40 which subdivide the space 37. The ducts 40 are transverse to the axis L-L of the nacelle and are distributed along said rear part 10R.

Furthermore, said precooler 30 comprises (see FIG. 8):
a distribution pipe 41 connected to the hot air inlet 31 and able to distribute said hot air (see arrows 42) within said space 37 (and therefore into the ducts 40) along the entire rear part 10R and transversely thereto; and a collection pipe 43 connected to the cooled hot air outlet 32 and able to collect said air (see arrows 44) passing through said space 37 through the ducts 40, along the length of the rear part 10R.

As illustrated in FIGS. 8 to 11, the cross section of the pipes 41 and 43 decreases from the front rearward, while the reverse is true of the distribution orifices 45 and the collection orifices 46 with which they are respectively provided.

The invention claimed is:

1. A bypass turbine engine for an aircraft, comprising:
   a hollow nacelle of longitudinal axis provided, at the front, with an air inlet and, at the rear, with an air outlet;
   a central hot-stream generator, positioned axially in said nacelle;
   a fan positioned axially in said nacelle forward of said central generator and able to generate a cold stream for said turbine engine;
   an outer fairing borne internally by said nacelle and an inner fairing surrounding said central generator, said outer and inner fairings between them delimiting a fan duct of annular cross section for said cold stream and said inner fairing delimiting with said central generator an intermediate chamber of annular cross section surrounding said central generator and provided with at least one rear orifice at the periphery of said hot stream; and
   a precooler comprising an inlet for a current of hot air bled from said central generator and an outlet for a current of cooled hot air generated using said cold stream, wherein:
   said precooler is positioned inside said intermediate chamber in thermal contact with the rear part of the inner fairing, forming an intermediate passage between said precooler and said central generator; and
   forward of said precooler, there is at least one air intake passing through said inner fairing and bleeding from said cold stream, a current of cooling air able at least partially to cool said current of hot air entering said precooler.

2. The turbine engine as claimed in claim 1, wherein said air intake is fitted with a controllable shut-off device.

3. The turbine engine as claimed in claim 1, wherein, inside said intermediate chamber and to the rear of said air intake there are means for setting said current of cooling air bled from said cold stream, in rotation about said longitudinal axis.

4. The turbine engine as claimed in claim 1, wherein said precooler and said intermediate passage have a shape of annular cross section and extend over the entire periphery of said rear part of the inner fairing about said longitudinal axis.

5. The turbine engine as claimed in claim 1, wherein, at least in its rear part said inner fairing comprises an inner wall and an outer wall which are parallel and separated from one another by a space in the form of an annular gap, and said cooler is positioned in said space.

6. The turbine engine as claimed in claim 5, further comprising:
   a distribution pipe, connected to said inlet for the current of hot air and able to distribute said hot air to at least approximately the entire length of said annular space; and
   a collection pipe connected to said outlet for the current of cooled hot air and able to collect said cooled hot air over at least approximately the entire length of said annular space.

7. The turbine engine as claimed in claim 6, wherein, between said distribution pipe and said collection pipe, said precooler comprises a plurality of curved ducts for guiding the hot air, said ducts being transverse to the longitudinal axis of the nacelle and distributed over the length of said annular space.

8. The turbine engine as claimed in claim 7, wherein said ducts are formed by a framework reinforcing said rear part of the inner fairing and secured to said inner and outer walls.

9. The turbine engine as claimed in claim 1, further comprising a bypass duct mounted in parallel with said precooler and connecting said inlet for the current of hot stream and said outlet for the current of cooled hot stream.

10. The turbine engine as claimed in claim 9, wherein said bypass duct is equipped with a controllable valve.

* * * * *